Oct. 10, 1939.    A. D. TRAHER    2,175,580
ELECTRICAL CIRCUIT
Filed April 12, 1938    4 Sheets-Sheet 1

INVENTOR.
ALBERT D. TRAHER.
BY
ATTORNEYS.

Oct. 10, 1939.  A. D. TRAHER  2,175,580
ELECTRICAL CIRCUIT
Filed April 12, 1938   4 Sheets-Sheet 2
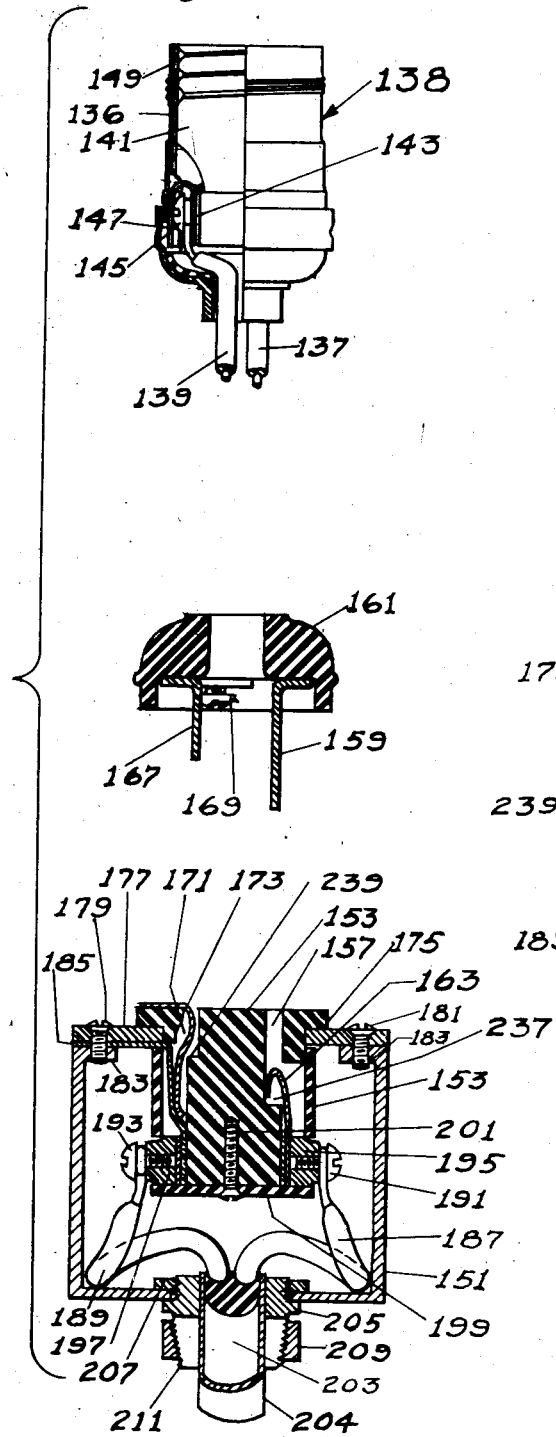
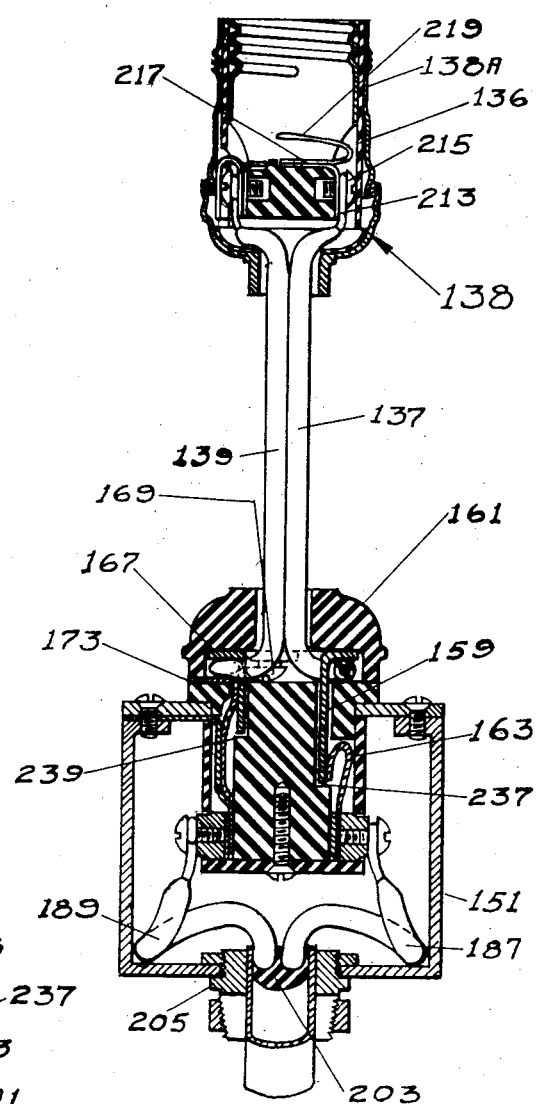
INVENTOR.
ALBERT D. TRAHER.
BY
Bomford Hamilton
ATTORNEYS.

Oct. 10, 1939.  A. D. TRAHER  2,175,580
ELECTRICAL CIRCUIT
Filed April 12, 1938  4 Sheets-Sheet 3

INVENTOR.
ALBERT D. TRAHER.
BY
ATTORNEYS.

Oct. 10, 1939.    A. D. TRAHER    2,175,580
ELECTRICAL CIRCUIT
Filed April 12, 1938    4 Sheets-Sheet 4
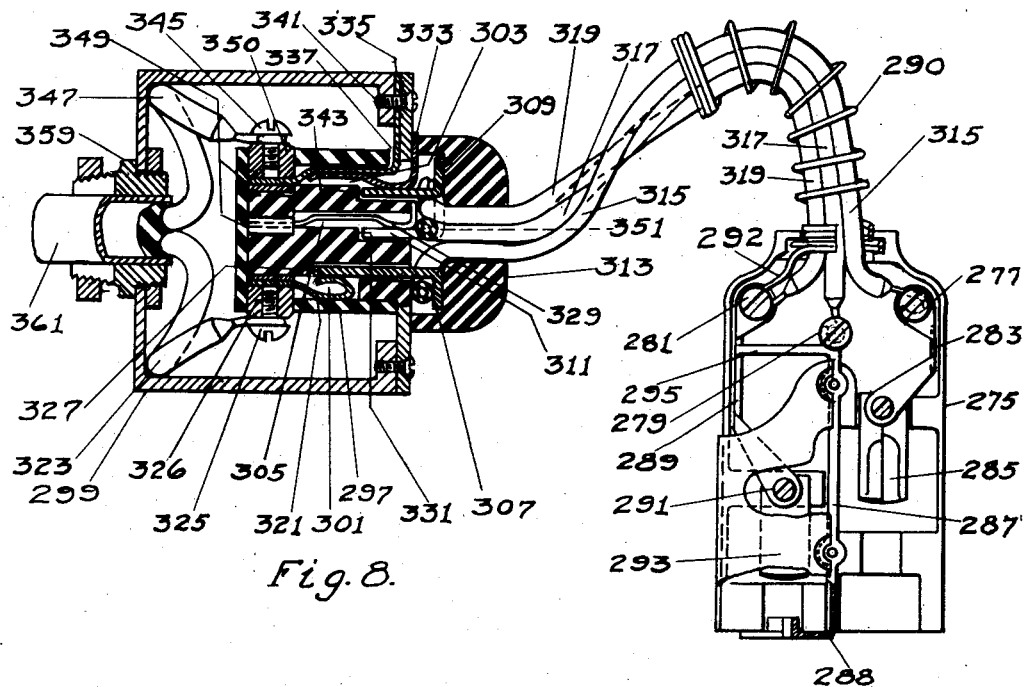
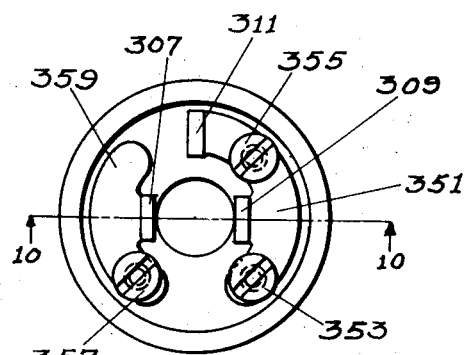
Fig. 9.
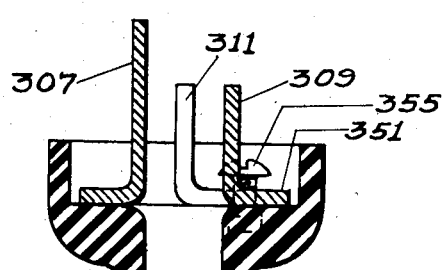
Fig. 10.
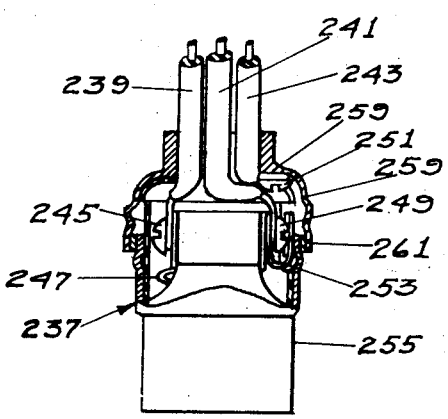
Fig. 11.
INVENTOR.
ALBERT D. TRAHER.
BY
ATTORNEYS.

Patented Oct. 10, 1939

2,175,580

UNITED STATES PATENT OFFICE 2,175,580

ELECTRICAL CIRCUIT

Albert D. Traher, Elizabeth, N. J.

Application April 12, 1938, Serial No. 201,516

19 Claims. (Cl. 171—97)

The fact that electrical appliances of the various kinds which are commonly employed in widely diversified applications frequently constitute hazards from fire and electrical shock, has led to stringent regulations regarding the installation of current-supply wires, construction of connectors, portable extension cords, and of the appliances themselves, in order to minimize such hazards; and considerable care is taken by the manufacturers of electrical equipment to render the same reasonably safe against such hazards arising as a consequence of service; but also such equipment is standardized against indiscriminate mistakes in making connections to the permanent wall outlets supplying the current to the attachment in question, because of the fact that such hazards are virtually eliminated when the entire circuit is properly polarized.

In this connection, it may be remembered that supply lines, extension cords and the like usually consist of at least two wires, one of which is intended to be energized, thereby carrying the current, while the other is intended to be a ground wire; and throughout any circuit it is intended that the wires to be energized shall be connected together on the same side of the line, and to the energized side of the building supply line, and, correspondingly, it is intended that the ground wires shall be connected together in a similar manner. When this condition is met throughout the circuit, the latter is said to be "polarized" and shock hazard is eliminated even if there be failure of insulation structure in the connectors themselves. However, although the proper wires are marked by standard identification which is well recognized by electrical workers, nevertheless it is very easy for the wires in a portable circuit to become connected to the wrong terminals, so that the polarity of the circuit is destroyed although the appliance will be fully operative notwithstanding the shifting of the connections; and as long as the insulation in the sockets, plugs and the like holds up, there is usually no great amount of hazard from either shock or fire arising under normal service conditions.

Nevertheless, it is well-recognized that many types of electrical appliances widely used in both industrial and domestic service, may have a decided shock-hazard attendant to their use, particularly where insulation in sockets, plugs, and the like may become worn or broken down so that the shell of such sockets or plugs becomes in electrical connection with the charged side of the supply line; and such shock-hazards frequently are sufficiently severe so as to cause serious consequences, particularly where the individual receiving the shock is in a position where an effective ground connection is made through the individual at the time when he receives the charge. All of the usual forms of appliances are subject to this danger, for while the supply line may be installed properly, and if the connections to the supply line be made properly, shock hazards would be substantially eliminated, there is made, nevertheless, ordinarily no positive provision against a change in polarity resulting when connection of an extension cord or the like is made to the supply line.

This is true, notwithstanding many proposals for preventing the possibility of making connections in such a way that a change of polarity through a fixture or lamp socket may result, so as to render impossible the making of electrical contact with the supply line unless the electrical leads to the socket, attachment plug, or the like are of the same polarity as the main supply line.

Such protective devices usually embrace attachment plugs and caps therefor, in which it is required that the contact pins of the cap can make engagement with the base terminals in a certain fixed relation only and that they cannot engage when reversed so that there can be no change in polarity, with consequent shock hazard in the event that the insulation provided for in sockets, plugs, and the like is imperfect or becomes broken when in service, with consequent energizing of external parts with which an individual is likely to come into contact. However, in the prior proposals of the prior art there is no such construction which will positively produce the intended result under all conditions.

It is to be borne in mind that there are provided customarily at least two current leads, one of these leads being intended to be a charged lead, while the other is a ground lead, and while corresponding leads are intended to be interconnected throughout the circuit, ordinarily, however, there is nothing provided to prevent positively the intended ground lead to become connected to the charged lead of the supply line, in which event there is a change of polarity in the appliance or socket with the likelihood of the shell of the socket or plug becoming charged, with the attendant shock hazard referred to above.

The present invention provides an improvement over the heretofore-proposed devices for preventing change in polarity, the invention providing, generally speaking, interrelated connecting devices provided with means positively preventing the outer shell of the connecting devices from becoming charged at any time during service when the lead wires are properly connected.

A further object of the invention is to provide electrical connecting devices which are protective in the manner above-described, and which are provided further with means for positively automatically placing such devices out of service in the event that connections within the devices become disarranged so that a change of polarity would tend to result because of such disarrangement.

A still further object of the invention is to provide an improved form of plug and socket so that it will be impossible to reverse the connections at the junction of an extension cord and a base plug.

A still further object of the invention is to provide a system of electrical connectors which will preserve the polarity of the circuit throughout the extent thereof irrespectively of a possible incorrect connection of the contacts on the improved plug with the proper wire of the extension cord or other current supply for the appliance being operated.

Further objects and advantages of the invention will become apparent as the description proceeds and the particular features of novelty will be pointed out in particularity in the appended claims.

It will be understood, of course, that it is customary for regulations to provide that the electrical wiring in a building of any kind must be polarized when installed, this requirement covering the circuits up to and including the baseboard connections and other outlets that are provided in the various buildings. However, this requirement cannot be extended to portable leads, such as extension cords or the like, which supply current to light fixtures, or pieces of portable equipment which may be operated from any such outlet, because the standard type of plug to be used on the extension cords can be placed in either one of two positions when the plug is put into the wall socket.

It is necessary in order to avoid the presence of shock hazards to have a completely polarized circuit, in which the ground wire must function as a ground wire even on the extension cords, but if the standard plug is placed in incorrect position in the socket, the ground wire on the appliance may become easily the energized wire, so that in the event of the protective insulation provided in the connectors becoming broken, or defective, which happens very frequently, there would be the likelihood of a shock hazard being produced. However, when an electrical circuit is polarized throughout, it is impossible to receive any electric shock by an individual coming in contact with the part of the apparatus or fixture that is connected to the ground wire of the circuit; and this condition holds true even if the individual were standing in a tub of water, or were in contact with any other effective ground, and touched a light fixture or shell of the fixture or attachment.

The present invention provides an improved plug and socket, and improved parts cooperating therewith so that it will be impossible to reverse the connections at the junction of the extension cord and the wall outlet, or between the connections between such an extension cord and the lead to a desired appliance.

The present invention will be understood more readily by reference to the accompanying drawings in which—

Fig. 2 is a sectional elevation showing an improved form of socket, plug, and plug-receiving socket in disassembled relation, illustrating details of construction of each of these units.

Fig. 3 is a sectional elevation showing the parts of Fig. 2 in assembled and interconnected position.

Fig. 8 is a sectional elevation of a still further modification of the invention including a three-wire circuit.

Fig. 9 is a bottom view of the plug cap shown in Fig. 8, illustrating details of construction.

Fig. 10 is a sectional elevation of the cap of Fig. 9, taken on the line 10—10 of Fig. 9.

Fig. 11 is a sectional elevation of a modified form of socket utilizing a three-wire connection.

Figure 1:
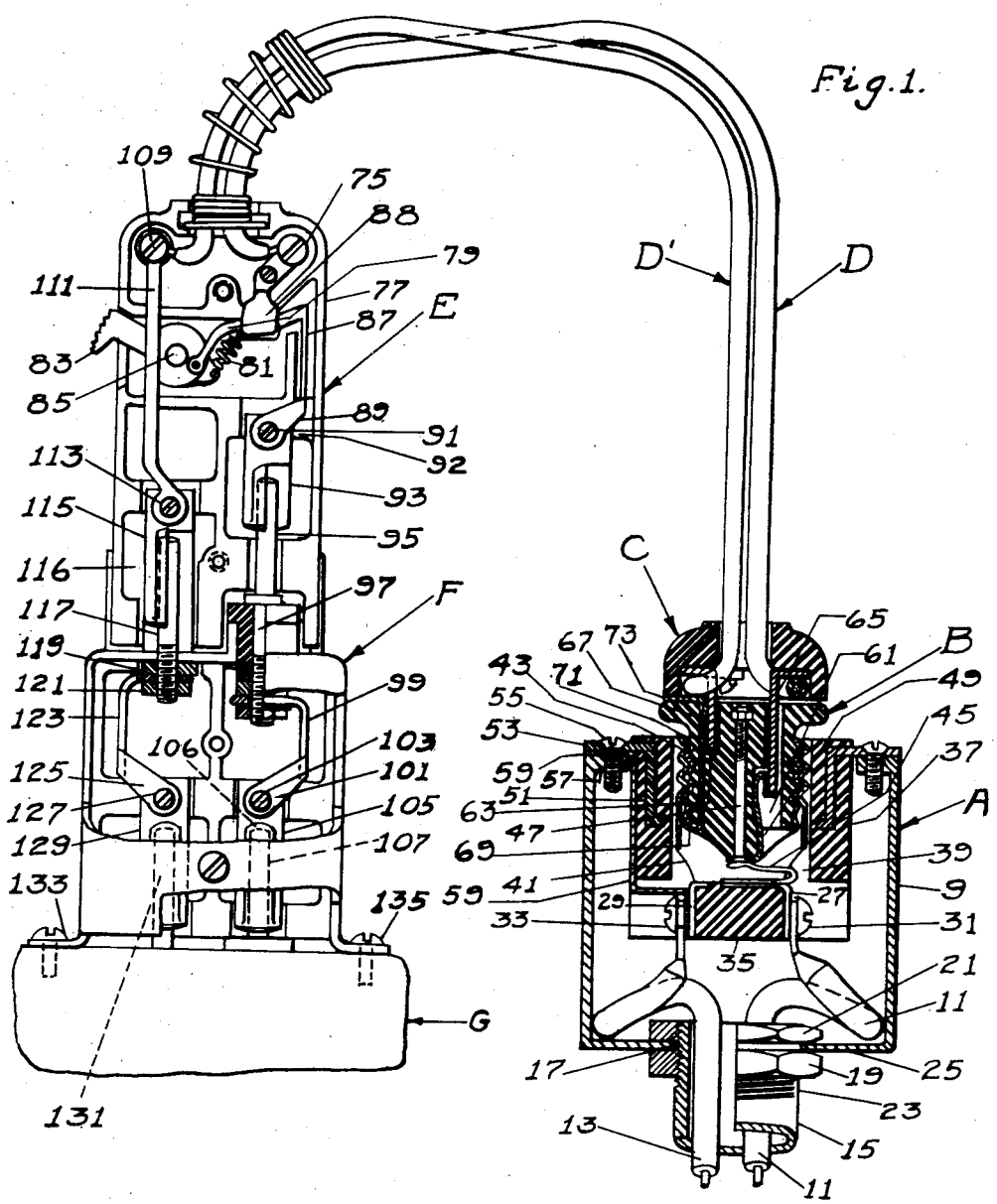
Fig. 1 represents a sectional elevation through one form of equipment embracing certain of the improvements of the present invention.

Referring first to the construction of the wall socket A, in Fig. 1, it will be seen that it comprises a metal shell 9, which forms a housing for various contact devices which will be set forth in detail hereinafter and which is permanently grounded. Current is supplied into the wall socket by leads 11 and 13 respectively, which represent leads from a house wiring circuit.

As is customary in electrical wiring, one of these leads is a charged lead, and the other one is grounded, the charged lead being illustrated in the drawings as the lead 11, the grounded lead being the lead 13. It will thus be seen that these leads form a polarized current supply, the leads being inserted into the wall socket A through a conduit 15, which is interconnected with the socket A as indicated at 17 and which is secured in locked position relative to the socket A by means of cooperating nuts 19 and 21 positioned on threads 23 of conduit 15 and in engagement with the opposite sides of the end wall 25 of the housing 9. The leads 11 and 13 are connected to contact strips 27 and 29 by means of screws 31 and 33, respectively, which are inserted through strips 27 and 29 and extend into the insulating block 35 which acts as a spacer separating the contact strips 27 and 29.

This insulating block 35 is a part of a socket assembly 37 which is removably mounted within the shell 9 of the wall socket, as is customary practice, the assembly 37 having a central recess 39 therein which receives a metal socket 41, the upper portion of which is threaded internally as is designated at 43 for receiving the attachment plug B, which is shown as being screwed into the socket 41.

A spring contact 45 which is riveted to the contact plate 27 is compressed upon insertion of the attachment plug B, and bears against the contact end of a pin 47 which is inserted in the attachment plug B and to which contact 49 is connected.

It has been stated above that one of the objects of the present invention is to provide current supplying devices for a lamp, or a portable electric appliance, which devices will form a polarized circuit throughout, thereby eliminating possibility of shock hazard through exposed surfaces of the connectors or appliance becoming charged because of failure of the insulation in the connecting devices, and/or improper connection of the lead wires in the connecting devices. This requires, therefore, that all of the connecting devices be protected by the embodiment forming this phase of improvement of the present invention, so that in the event of failure of insulation or improper connection of any of the lead wires which supply the current to the appliance, a short circuit will be caused immediately, with consequent burning out of the fuse in the supply line, so that the entire circuit becomes deenergized.

It will be seen that the insulating housing 37 for the socket 41 is mounted in the shell 9 by the provision of suitable metal inserts 51, which are provided with an outwardly extending flange 53 which serves as attachment means for each insert 51 by means of suitable screws or the like 55 which pass through each flange 53 and through suitably spaced lugs 57 of the shell 9.

It will be seen further, that the ground contact strip 29 has secured to it an additional metallic strip 59 which extends upwardly along one side of the insulating housing 37 and contacts with the shell 9 by extending along the underside of flange 53 of metal insert 51 and held by screw 55, the screw 55 passing therethrough and holding the parts in tightly assembled relation. This means, therefore, that the socket assembly 37 is permanently grounded, the shell 9 being grounded through the conduit 15 so that the strip 59 provides a positive metallic ground from the ground wire 13 to the ground provided in the installation through the metallic casing that protects the wires 11 and 13.

It will be apparent that the attachment plug B is provided with recesses which are adapted to receive the pins from the attachment plug cap C. One of these recesses 61 is shown as being substantially deeper than the other recess 63. It will be seen also that the recess 61 is disposed so as to expose the long spring contact strip 49 to engagement with a long prong 65 of the attachment plug cap C, whereas the shallow recess 63 receives a short prong 67 of the attachment plug cap, which engages a metallic spring contact strip 69, which is secured in the body of the attachment plug B, and which is permanently connected with the outer threaded metallic surface 71 of the plug B, this surface engaging the threads 43 of the socket 41. The strip 69 is shown as being provided with a bent extension 73 which overlies the flat end of the attachment plug B. It will be noted that the pin 65 of the attachment plug cap C is substantially longer than the pin 67 and that the pin 65 engages the energized contact strip 49, so that when the parts are assembled pin 65 is on the energized side of the circuit whereas the pin 67 engages the strip 69, which accordingly becomes a ground strip. This means that in order to make contact with the lead strips 49 and 69, the cap C must be inserted so that the long pin 65 always will contact with the strip 49 and the short pin 67 must contact always with the strip 69.

From this it is obvious that if the long pin 65 were inserted in the short recess 63, it would not be possible to complete the circuit, so that the cap C and the attachment plug B may be connected operatively only in one way, and that way is to maintain the entire circuit polarized, and the disconnecting of the attachment plug C will not change the polarized condition of the system, there is only one way to reconnect the cap and plug and that is the correct way.

The provision of this cooperating cap and plug with the different lengths of pins with the plug B provided with the recesses or pockets of a depth corresponding to the length of the respective pins, would be adequate protection for maintaining the complete circuit in polarized condition were it not for the possibility of the insulation in the connectors failing, to cause the shell of the attachment sockets and plugs to become charged.

In view of the fact that it may be possible for such failures to occur, the ground strip 69 is provided, which grounds the outside of the attachment plug B, and correspondingly grounds the socket 41 of the wall plug A through the contact strip 29.

The provision of this ground renders it impossible for the circuit to be maintained operative in the event of insulation failure, as the casing or shell of the attachment plug would become shorted through such occurrence, with the result that the current supply fuse will be immediately blown out.

A similar condition exists with respect to the appliance plug E. The energized lead D is connected to the energized terminal 75 which is enclosed in the casing 77 of the appliance plug, this casing being split, as is customary; and the housing includes conventional switch mechanism including a switch arm 79 which is controlled by a spring 81 and actuated by a switch lever 83 pivotly mounted on a pin 85 which forms the axis upon which the lever 83 moves and which is suitably mounted in the shell or housing 77 of the appliance plug.

Further tracing the energized side of the circuit, it will be seen that it comprises a conductor strip 87, which is connected to the underside of one side of a forked contact 88 and which is bent as shown at 89 for connection by a screw 91 to a forked spring contact strip 93, positioned in a deep recess 92 in which is received a long connector pin 95, which pin contacts with the strip 93 in close engagement therewith, and which connects with a lead 97 to which is secured a conductor strip 99 in the adaptor housing F, current flowing through the strip 99 to the contact 101, which is secured by screw 103 to a forked contact strip 105 which defines a recess 106, in which is received a pin 107 in engagement with the strip 105.

On the grounded side, the ground lead D' is connected with a ground terminal 109 in the appliance plug E, to which terminal is secured a conductor strip 111, which connects also with a terminal 113, this terminal securing the strip 111 with a forked spring contact 115 located in a shallow recess 116 in which is received the relatively short connection pin 117 from the adaptor F.

The pin 117 threads into adaptor F and threadedly receives a metallic nut 119 which engages with the metallic shell of the adaptor F, forming a ground connection therewith.

The connecting pin 117 also receives a second nut 121, there being secured between the nuts 119 and 121 a lead 123, which is formed into a connector 125 which is secured by means of a screw 127 to a spring connector 129 which receives pin 131 of the appliance G. The appliance G is secured to the adaptor F by means of screws 133 and 135. It will be seen from the above that the shell of the adaptor F constitutes the ground contact to the appliance G, the nut 119 forming a positive ground connection together with the threads on pin 117, these threads contacting with complemental threads in the adaptor F.

Reference may be made at this point to certain details of construction of the attachment plug B and the cap C therefor. It will be noted in this connection that the energized contact pin 65 is made substantially longer than the ground contact pin 67, and that the recess 61 which is adapted to receive the pin 65 is substantially deeper than the recess 63 which is designed to receive the ground contact pin 67. It will be seen also that the spring contact 49 which communicates with the recess 61 for contacting with the energized pin 65 is substantially longer than the ground contact 69, so that it becomes evident that contact of the pins of the cap C can be made with the contacts in the plug B only when the pins of the plug cap C are inserted in one way only in the recesses in the plug; for in the event that the cap becomes reversed so that the long pin 65 were inserted in the short recess 63, the short contact pin 67 would fail to make connection with the contact 49 in the deep recess 61, so that the right way is the only way in which the cap and plug can be connected for current to flow therethrough. It will be seen also that when the cap and plug are assembled, the contact is made on the ground side first, this ground contact being broken last when the cap is removed from the plug, thus assuring instant de-energization of the complete circuit.

These details of construction are shown more clearly in Fig. 2, wherein are shown parts of a somewhat modified construction in disassembled relation, but in which the principles of the invention are retained in a manner similar to the showing of Fig. 1.

In Fig. 2, 138 represents a screw socket which receives an insulating lining 136 and which receives conductor strips 137 and 139, conductor 137 being the energized conductor, and conductor 139 being the ground conductor. The conductor 139 is connected to the ground lead 143 in the inner shell 141 of the socket by means of terminal screw 145, there being provided an auxiliary ground connection 147 held by the screw 145, and connecting the contact 143 with the metallic shell 149 of the socket 138, thereby positively grounding the lead 143 to the outer metallic shell 149.

The wall socket is shown as comprising a shell 151 having an internally extending socket which receives an attachment plug 153 which is generally similar to the attachment plug B shown in Fig. 1 except that plug 153 is not a threaded plug. The plug 153, however, is shown as being provided with a deep recess 157 which is adapted to receive the long contact pin 159 of the attachment plug cap 161; and the recess 157 is shown as being provided with a relatively long spring contact 163 which is generally similar to the contact 49 of Fig. 1. The parts when connected form the energized side of the circuit, it being understood that the conductor wire 137 is intended to be connected to the long contact pin 159 as will be seen from Fig. 3, which view shows the parts of Fig. 2 in connected relation.

The ground side of the circuit comprises the ground wire 139 which is intended to be connected to the short ground pin 167 of the cap 161 by means of a terminal screw 169, the pin 167 being adapted to be received in the shallow recess 171 of plug 153, in order to make contact with the spring contact 173 which is adapted to engage the pin 167 as is shown clearly in Fig. 3. It will be seen that the plug 153 is provided with an annular flange 175 which is supported on a collar 177 of the shell 151 of the wall socket, the collar 177 being shown as being secured to the shell 151 through the medium of screws 179, 181 which pass through suitably spaced inwardly extending lugs 183 of the shell 151.

Mounted between the collar 177 and the lugs 183, and held in position by the screw 179 which passes through the collar 177 and the lugs 183, is a ground contact strip 185 which connects with the spring contact strip 173, so that the shell 151 will be grounded through the strip 185 and sheath 204 of the cable 203.

Spring contacts 163 and 173 are connected to the house current supply leads 187 and 189, respectively, by means of terminal screws 191 and 193, which are mounted in metallic contacts 195 and 197, respectively, which inserts are held oppositely disposed in the plug 153 by an insulation plate 199 which is secured to the plug by means of a screw 201.

The lead 187, terminal screw 191, and spring contact 163 represent the energized side of the wall plug construction, whereas the lead 189, terminal screw 193 and contact strips 173 and 185 and metal insert 197 represent the ground side.

The leads 187 and 189 are shown as being brought into the shell 151 through a cable 203, which has a usual metallic sheath 204. The cable 203 is shown as being connected to the shell 151 by means of a bushing 205 which extends into the interior of shell 151, and which is held in position by a lock nut 207 on the interior of the shell 151, and also by means of a nut 209 which is threadedly mounted on a wedge-shaped collar 211, which is a part of bushing 205. It will thus be seen that the shell 151 is grounded through the ground strip 185 to the metallic cable 203, there being provided, therefore, a permanent ground connection for the shell 151, and consequently for the entire circuit.

From Fig. 3 it will be seen that the energized conductor wire 137 is connected to a contact strip 213 in the socket 138, connection being made by means of screw 215, a spring contact 219 to which the wire 137 is attached and which is threaded into strip 213, a spring contact 219 being riveted as indicated at 217, to the strip 213.

It will be seen from these views that the construction illustrated is a very simple construction for maintaining extension sockets and connecting devices positively grounded, thereby preventing the metallic shells of such devices from becoming energized from any cause; and it will be seen also that if for any reason the metallic shell of such connectors should come in contact with exposed conductors on the energized side of the circuit, there would result immediately a short circuit through such shell which would immediately render the circuit inactive by disrupting the fuse in the supply line.

It will be seen, however, that while the proper connections are easily made, since the ground side of the connecting instrumentalities may be identified readily through the provision of the supplemental ground contact strip inserted in each connecting device, and the ground wires of all equipment is identified in standard manner which is recognized immediately to electricans, nevertheless, it may be that in the forms of the invention illustrated and described to this point the lead wires may become reversed in connecting the parts, so that the energized conductor may become connected to the ground terminal of the socket or other connecting devices, in which event the shell thereof will become energized, with consequent production of a shock hazard. In order to avoid such possibility, additional modifications of the construction may be provided which will be described hereinafter.

As has been described above, if there should be a failure of any insulating structure provided in the sockets or plugs of the system, there will be an immediate short circuit formed through the shell of the plug or socket thus affected, in view of this shell being grounded to the ground terminal of the plug or socket, and consequently the current being supplied to the attachment will be shunted through the shell.

Figure 5:
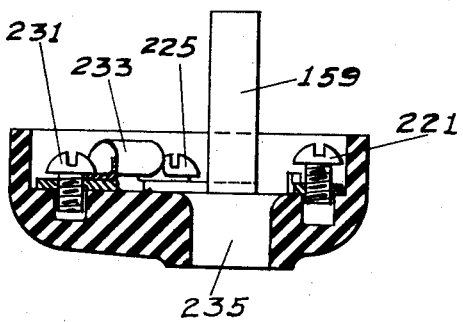
Fig. 5 is a sectional elevation taken along the line 5—5 of Fig. 4, looking in the direction of the arrows.
Figure 6:
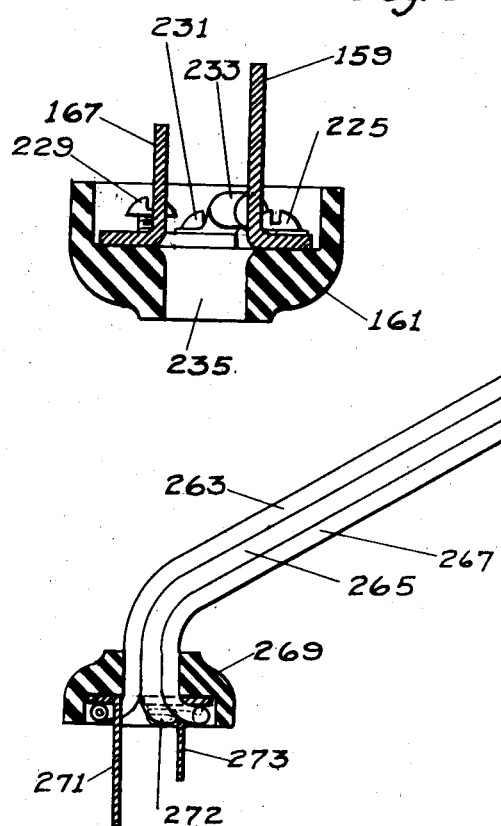
Fig. 6 is a sectional elevation taken along the line 6—6 of Fig. 4, looking in the direction of the arrows.

This short circuiting of the plug or socket will cause the fuse in the supply line to be burned out, thus rendering the circuit immediately inoperative. Obviously, this occurrence might be the source of a not inconsiderable inconvenience, especially where the fuse in the supply line is located in an inconveniently accessible location. Consequently, in order to avoid such inconvenience, the form of plug cap shown in Figs. 4, 5, and 6 may be employed.

Figure 4:
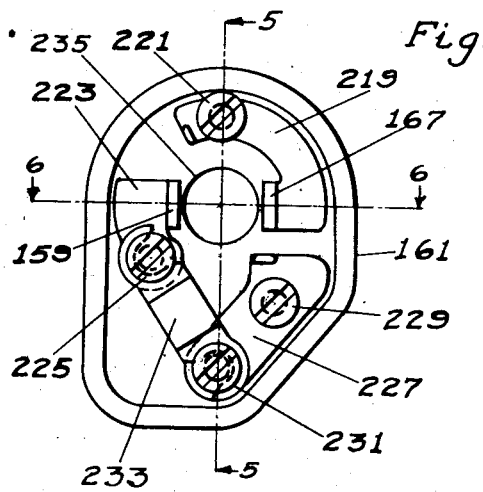
Fig. 4 is a plan view of one side of a plug cap somewhat similar to the caps shown in Figs. 2 and 3, but embracing further protective features.

From Fig. 4 it will be seen that the contact pin 167 on the ground side of the plug is provided with the conducting strip 219 which connects with the terminal screw 221 for attachment of the ground conductor wire. This is in accordance with the standard construction.

Also, it will be seen that the long contact pin 159 for the energized side of the circuit is provided with a conductor strip 223 which connects with a terminal 225, and that a second conductor strip 227 is provided, which is in contact with two terminals 229 and 231, the terminal 229 providing attaching means for the energized wire of the circuit, there being a suitable fuse 233 provided and secured to the terminals 225 and 231, this fuse bridging the gap between the conductor strips 223 and 227; and this fuse 233, which is readily accessible and immediately replaceable, will be the fuse that will be burned out if short circuiting occurs. The opening for the passage of the conductor wires is designated as 235.

A further feature of the improved attachment plug and cap construction lies in the provision of shoulders in the base of the plug, indicated at 237 and 239 respectively in the plug member, and which define the bottoms of the recesses. Consequently, it will be seen that the shoulder 239 is at a substantially shorter distance from the face of the plug than is the shoulder 237, the body of the plug being cut away sufficiently far so that the short ground contact pin 167 will reach approximately to the shoulder 237. This means, therefore, that the cap 161 of the plug cannot be reversed under any conditions and still make contact between the contact pins and the spring contacts supplying current to the plug, since if such reversal were attempted, the contact pin 159 of the energized side of the circuit would engage the shoulder 239 long before there would be a possibility of the short contact pin 167 reaching the spring contact 163 on the energized side; and such engagement of the contact pin 159 with the short shoulder 239 would prevent entirely further insertion of the cap 161 into the plug, so that the cap cannot be connected with the body of the plug except when the pins are inserted in the only proper way in the recesses.

Notwithstanding the above described precautions which will safeguard the attachments from the likelihood of shock hazard when connections are made by an operator familiar with the standard designations of the leads which are customarily provided, as have been indicated above, nevertheless that by employing the system as described down to this point, it may be possible for an unskilled worker to reverse the connection of the lead wires 137 and 139 in the plug cap 161 so that the intended ground lead 139 will become energized, and the lead 137 will become the ground lead, thereby destroying the polarized circuit, and directly energizing the shell of the socket, for instance the shell 138a of the socket 138.

Figure 7:
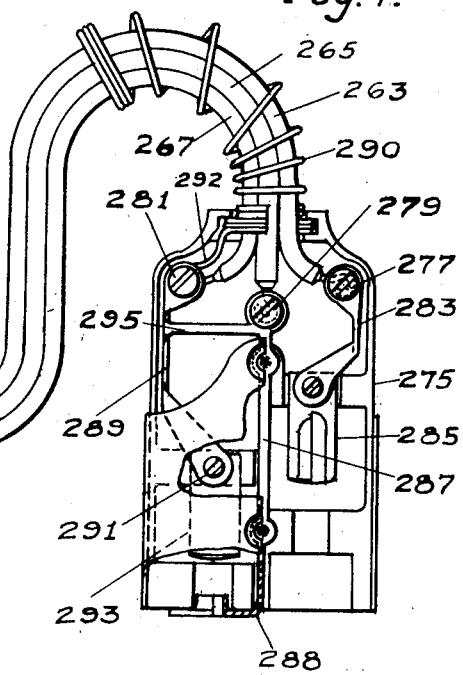
Fig. 7 is a sectional elevation showing a modified form of the invention, as applied to a portable circuit using three lead wires.

In order to prevent such occurrence, there may be provided the form of socket shown in Fig. 11 or the modified construction shown in Fig. 7.

Fig. 7 shows a further modification giving a still greater degree of protection and wherein there is illustrated the three wire connection as applied to an appliance plug and a modified form of attachment plug cap embodying the safety features described above, but modified in construction so as to adapt it to the three wire circuit.

In Fig. 7, the energized lead wire is indicated at 263, two ground wires being designated as 265 and 267, respectively. The lead wires are shown as being connected in a modified form of an attachment plug cap 269 having a relatively long contact pin 271 for the energized side of the circuit, and a relatively short contact pin 273 for the ground side of the circuit. It will be seen that both the ground wires 265 and 267 are connected together in the cap 269 on terminal screw 272 located in ground contact pin 273.

In the attachment plug 275 there are provided three terminal screws for receiving the three lead wires. These terminal screws are indicated at 277, 279, and 281, the energized conductor lead 263 being connected to the screw 277, the ground leads being connected to the screws 279 and 281, respectively. A lead 283 connects the screws 277 of the energized side to a suitable contact in the deep socket 285 which is adapted to receive a long contact prong on a suitable attachment adapter, not shown. Also, leads 287 and 289 connect the ground terminal screws 279 and 281, respectively, with a suitable contact indicated at 291 in the relatively shallow socket 293 provided for the reception of a relatively short contact pin on the ground side of the attachment adaptor. The conductor leads 287 and 289 are interconnected by means of a conductor 295, so that again if the connections of the energized and ground leads become reversed, there will be an immediate short circuit produced, which will result in the destruction of the current supply fuse. The ground leads 287, 289 are connected also to the outer metallic casing of plug 275, and it will be seen also that the spring guard 290 is grounded by a ground connector 292 to the ground screw 281, which connects with the metallic casing of the plug.

It will be seen that the lead 287 is continued into an extension 288 bent over the end of the connector member 275, as is shown on Fig. 7, and 7 which is provided with a suitable hole for receiving a ground pin from the appliance plug that is received in the socket 293, this constituting an arrangement of parts that provides a collar directly connected with one of the ground legs through which the pin must pass before it can contact in socket 293. The socket 293 is electrically connected to one of the ground legs, and the extension 288 is connected electrically to the other ground leg. With this arrangement, the shunt 295 and the conductor strip 349 (Fig. 8) could be eliminated and the circuit would function as a positively polarized system, because the connections on the terminal screws 277, 279 and 281, would be reversed without throwing the arrangement out of positive polarity, because if the assembly were placed incorrectly on the prongs or pins of the male side of the connection, or if the connections on the terminal screws 277, 279, and 281 were reversed, the circuit would still be put out of service because a short circuit would be set up, thereby blowing the protective fuse for the circuit.

In order to further avoid the possibility of reversal of connections of the conductor leads as has been described above, the construction of Fig. 7 may be modified further, as is indicated in Figs. 8, 9, 10, and 11.

A typical connection embodying this modification is shown in Fig. 8, which shows a modified form of plug and cap which embodies the principles of the further modified connections of the conduit leads. It will be seen that the construction of this circuit embraces a three-wire system of conductors, one of which is for the energized side of the circuit, the other two conductors being ground leads. For the two ground conductors, there are provided a pair of ground contacts, the ground terminals in both the plug and cap being bridged by a suitable conducting strip which will cause a short circuit immediately in the event that the conductors become connected wrongly.

From Figs. 8, 9, and 10, it will be seen that an attachment socket 297, which is illustrated in Fig. 8 as being inserted in a wall box 299, is provided with three pockets, indicated at 301, 303, and 305, respectively. These three pockets receive corresponding contact pins 307, 309, and 311, which are provided in the plug cap 313. To these contact pins are attached lead wires 315, 319, and 317, respectively.

The plug and cap embody generally the features of safety which have been described previously in connection with the plug and cap illustrated in Figs. 2 and 3. That is to say, the pocket 301 of the plug 297 is a deep pocket, containing a spring contact 321 which is adapted to fit snugly against the long contact pin 307 of the plug 313, this contact pin being intended for the energized side of the circuit. Consequently, spring contact 321 is energized from the energized lead 323 of the supply line, the lead being connected to the socket 297 through a screw 325 and a metal insert 326 to which is attached spring contact 321 which supplies current to the spring contact 321. The deep pocket 301 is provided with a deep shoulder 327, permitting access of the pin 307 to the contact 321.

Pocket 305 in the plug 297 is provided with a long spring contact 329 and a shallow shoulder 331 for receiving the short contact pin 311 to which the conductor lead 317 is attached. Similarly, the pocket 303 contains spring contact strips 333 and ground strip 335, the former passing between the opening 337 of the wall socket 297, the strip 335 being held in position by the screw 341, this being one of the screws which holds the socket 297 in position on the body of the wall box 299. Contact strip 333 is held by the strip 335. This strip 333 is bent to closely engage the contact pin 309 of the plug 313, the pin 309 coming into approximate engagement with the shallow shoulder 343 in the pocket 303.

The lead 319 is connected to the pin 309. The contact strips 329, and 335 are connected to a conductor strip 349 which is attached to a metal insert 350 which holds screw 345 for connecting ground wire 347. The conductor strip 349 is also connected to strip 335 and the metal insert 350 to the ground screw 345 and bridges the ground contact strips 329 and 335, thus forming a shunt across these contact strips. Also, the ground contact pins 309 and 311 of the plug cap 313 are connected together by a conductor strip 351, this conductor strip 351 being held in position in cap 313 and supports screws 353 and 355, which screws form the connecting means for the ground lead wires 317 and 319. The energized lead 315 is connected by means of a screw 357, a conductor strip 359 connecting the energized pin 307 with the screw 357. The attachment plug shown in Fig. 8 is of the same construction as that shown in Fig. 7 and the same reference numbers apply to Fig. 7 designate like parts on Fig. 8. Thus, the energized lead 315 is connected to the energized terminal 277 in the attachment plug 275, the terminal 277 also having connected with it the energized conductor strip 283 which communicates with the deep pocket 285 for the energized side of the circuit, which pocket receives a long contact prong from the attachment cap which fits into the plug 275. Also, the ground conductor 317 is connected to a ground terminal 279, and the ground conductor 319 is connected to the ground terminal 281 of the plug 275. The terminal 279 is connected with a conductor strip 287 which extends to the end of the plug 275 and is bent thereover to receive the ground pin of the attachment cap. Also, ground terminal 281 is connected to a conductor strip 289 which leads through contact 291 to the ground terminal pocket 293 of the plug 275. The ground leads 287, 289 are interconnected by the strip 295 which bridges the two ground conductors 287 and 289.

In accordance with this arrangement, as long as the conductor leads are properly connected throughout the circuit, the circuit will be completed and will be operative; but in the event that any of the contacts leads become transposed in any part of the circuit, the circuit will become immediately shorted with a blowing out of the protective fuse of the circuit; and with this arrangement, it becomes impossible to transpose any of the contacts or leads anywhere in the circuit and maintain the circuit operative; and consequently, it will be impossible for any part of the circuit to produce a charge upon the casing of any of the plugs or sockets employed anywhere in the system. Obviously, the wall box 299 is grounded through the connecting collar 359 and the casing 361 of the supply cable.

Referring to Fig. 11, it will be seen that the socket 237 is provided with three conductor leads instead of two, lead 239 being the energized lead, while leads 241 and 243 are grounded. It will be seen that the energized lead 239 connects with the terminal screw 245, to which is connected a spring contact 247 in the usual manner. One of the ground leads 241 is connected to a terminal screw 249, while the other ground lead 243 is connected to the terminal screw 251. Contact strip 253 connects the grounded terminal screw 249 with the shell 255 of the upper section of the socket 237, whereas the screw 251 secures lead 243 to the shell 259 of the lower section of the socket 237. The ground strip 253 and shell 259 are connected together as indicated at 261. Therefore, if the connections for the energized lead 239 and either of the ground leads 241 or 243 should become reversed, a short circuit will be produced, and the fuse in the supply line is burned out immediately.

From the foregoing description, it will be seen that the substance of the present invention may take various specific forms, all of which include, however, an electrical connector and a circuit including the same, wherein positive protection against shock hazard is afforded, and wherein the circuit is maintained completely polarized throughout, and will be immediately rendered inoperative upon any of the parts of the circuit being connected so as to change the polarity of the circuit in any part thereof, thereby affording complete protection against shock and fire hazards.

It will be understood from the above description that the invention is not limited, necessarily, to the specific details of the construction as are herein specifically illustrated and described, but it will be apparent that such details are subject to various modifications which will become apparent to one skilled in the art, without departing from the spirit of the invention; and it will be understood, therefore, that it is intended and desired to include within the scope of the invention such modifications and changes as may be necessary to adapt it to varying conditions and uses, and that the following claims are intended to cover all of the generic and specific features of the invention herein described, and all statements of the scope of the invention which, as a matter of language, might be said to fall therebetween.

What is claimed is:

1. An electrical system for connecting electrical appliances to a polarized source of electrical current to produce compulsorily a completely polarized circuit, comprising conductor means defining ungrounded and grounded sides for the circuit, connecting devices for connecting the said conductor means to the appliance and to the source of current so that a complete circuit will be formed when the said devices are operably connected, additional ground means for the circuit, and means for producing an immediate short-circuiting of the system in event of reversal of connections of the conductor means to the connecting devices, thereby preventing possibility of any change in polarity of the circuit and eliminating shock hazards incident to insulation failures in the connecting devices.

2. An electrical system for connecting electrical appliances to a polarized source of electrical current to produce compulsorily a completely polarized circuit, comprising conductor means defining ungrounded and grounded sides for the circuit, connecting devices for connecting the said conductor means to the appliance and to the source of current so that a complete circuit will be formed when the said devices are operably connected, and additional ground means for the circuit, the grounded side of the circuit and the additional ground means being interconnected to produce an immediate short-circuiting of the circuit in event of reversal of connections, thereby preventing possibility of any change in polarity of the circuit and eliminating shock hazards incident to insulation failures in the connecting devices.

3. An electrical system for connecting electrical appliances to a polarized source of electrical current to produce compulsorily a completely polarized circuit, comprising conductor means defining ungrounded and grounded sides for the circuit, connecting devices for connecting the said conductor means to the appliance and to the source of current so that a complete circuit will be formed when the said devices are operably connected, additional ground means for the circuit and a metallic connecting strip in at least one of the connecting devices forming a metallic connection between the grounded side of the circuit and the said additional ground means to produce an immediate short-circuiting of the circuit in event of reversal of connections, thereby preventing possibility of any change in polarity of the circuit and eliminating shock hazards incident to insulation failures in the connecting devices.

4. An electrical system connecting electrical appliances to a polarized source of electric current to produce compulsorily a completely polarized circuit, comprising conductor means defining ungrounded and grounded sides for the circuit, connecting devices for connecting the said conductor means to the appliance and to the source of current so that a complete circuit will be formed when the said devices are operably connected, additional ground means for the circuit, and shunt means connecting the grounded side of the circuit to the said additional ground means for eliminating shock hazards in event of insulation failures in the connecting devices and for preventing operation of the appliance in the event of reversal of connections of the said conductor means, thereby preventing change in polarity of the circuit.

5. An electrical system for compulsorily producing a polarized extension for a polarized current supply circuit, which comprises, in combination, a wall connector for connecting the said extension to the polarized supply circuit, the said wall connector having an ungrounded terminal and a ground terminal adapted to be connected to the ungrounded side and grounded side, respectively, of the polarized circuit, a metallic casing, an insulating member within the casing, a plurality of contact members mounted in the insulating member, means electrically connecting the contact members to the ungrounded terminal and to the ground terminal, respectively, of the connector, a plurality of lead wires connecting the wall connector to an appliance connector provided with a metallic casing, one of the said lead wires forming the ungrounded side of the extension circuit, another of the lead wires forming the grounded side of the extension circuit, a ground connection for the metallic casing of the appliance connector, means for electrically interconnecting the grounded side of the extension circuit to the ground for the metallic casing, to render the extension inoperative upon reversal of connection between the ungrounded and grounded sides of the extension, to eliminate shock hazard at the metallic casing, a ground for the metal wall connector casing, and means electrically interconnecting the said casing to the grounded side of the polarized circuit.

6. A polarized extension for a polarized circuit, which comprises, in combination with current leads to an appliance, a connector including a metallic casing, an insulating member within the casing, a plurality of contact members mounted in the insulating member, one of which comprises a ground contact, a ground connection for the metallic casing, and a metallic shunt member electrically connected to the said ground contact and to the ground connection, thereby maintaining the said extension continuously polarized and rendering the same instantaneously inoperative upon reversal of connections while also eliminating shock hazard from the metallic casing incident to insulation failure in the said casing.

7. A polarized extension for a polarized circuit, which comprises, in combination, a connecting device for connecting the extension to the circuit, the said device having an ungrounded terminal and a ground terminal adapted to be connected to the ungrounded side and grounded side, respectively, of the polarized circuit, a metallic casing, an insulating member within the casing, a plurality of contact members mounted in the insulating member, current leads connecting the said connecting device with an appliance having a metallic casing, one of which leads forms the ungrounded side of the extension, and two of which leads define ground leads, one of which forms the grounded side of the extension and the other of which forms a ground for the metallic casing, means in the connecting device for electrically interconnecting the ground leads and a shunt connection in the said metallic casing electrically connecting the said ground leads in the casing.

8. An electrical connection for a polarized electrical system comprising a metallic casing, an insulating member within the casing, a plurality of contact members mounted in the insulating member, one of which comprises a ground contact for the system, a grounding member for the casing, and a metallic member electrically connecting the ground contact and grounding member to effect grounding of the casing and short-circuiting the system upon reversal of connections, while also eliminating shock hazard from the metallic casing incident to insulation failure in the said casing.

9. An electrical system for connecting electrical appliances to a polarized source of electrical current to produce compulsorily a completely polarized circuit comprising conductor means defining ungrounded and grounded sides for the circuit, connecting devices for connecting the said conductor means to the appliance and to the source of current so that a complete circuit will be formed when the said devices are operably connected, additional ground means for the circuit, means for producing an immediate short circuiting of the circuit in event of reversal of connections, thereby preventing possibility of any change in polarity of the circuit and eliminating shock hazards incident to insulation failures in the connecting devices and appliance, and a single fuse in one of the connecting devices, the fuse being located in the ungrounded side of the circuit, the said fuse being adapted to be disrupted incident to the said short circuiting of the circuit and overloading of the appliance.

10. In a polarized electrical circuit, connecting devices for connecting current conductors to a source of current and to an appliance, the said conductors forming an ungrounded side and a grounded side of the circuit, additional ground means electrically connected to the connecting devices to define a metallic ground, and metallic means carried by the connecting devices interconnecting the grounded side of the circuit with the metallic ground to form compulsorily a completely polarized circuit.

11. In a polarized electrical circuit, connecting devices for connecting current conductors to a source of current and to an appliance, at least some of which connectors have a metallic casing, the said conductors forming an ungrounded side and a grounded side of the circuit, additional ground means electrically connected to the metallic casings to define a metallic ground, and shunt devices in the said connecting devices connecting the grounded side of the circuit with the metallic ground to form compulsorily a completely polarized circuit.

12. In a polarized electrical circuit, connecting devices for connecting current conductors to a source of current and to an appliance, at least some of which connectors have a metallic casing, the said conductors forming an ungrounded side and a grounded side of the circuit, additional ground means electrically connected to the metallic casings to define a metallic ground, shunt devices in the said connecting devices connecting the grounded side of the circuit with the metallic ground to form compulsorily a completely polarized circuit, the said shunt devices in the metallic casings being electrically connected to the casing as well as to the grounded side of the circuit and to the metallic ground, to prevent the metallic casings from becoming energized in event of insulation failure within the casing.

13. In a polarized electrical circuit, an electrical connection comprising a metallic casing composed of a plurality of component members, an insulating member within the casing, a plurality of contact members mounted in the insulating member, one of which comprises a ground contact for the circuit and another of which comprises a ground contact for the metallic casing, a metallic grounding member clamped between component members of the casing to be electrically connected therewith and having provision for electrical connection to both the ground contact for the circuit and the metallic ground contact for compulsorily forming a completely polarized circuit, and for protecting the casing against becoming energized in event of failure of the insulating member in the casing.

14. In a polarized electrical circuit, an electrical connection comprising a metallic casing, an insulating member within the casing, a plurality of contact members mounted in the insulating member, the contact members including a ground for the circuit and a ground for the casing, and a metallic grounding member electrically connected to the casing and to both grounds for compulsorily forming a completely polarized circuit and for protecting the casing against becoming energized in event of failure of the insulating member in the casing.

15. In a polarized electrical circuit, a fixed polarity attachment plug comprising a base having recesses, contacts in said recesses, the recesses being of different lengths, contacts in the said recesses, there being a short contact in a long recess and a long contact in a short recess, a cap for attachment to the base having a relatively long and a relatively short contact blade so that when the cap and base are assembled the relatively long contact blade engages the relatively short base contact, and the relatively short base contact engages a relatively long base contact, the said long contact blade and the short base contact being adapted to be in the ungrounded side of the circuit and the short contact blade and long base contact being adapted to be in on the grounded side of the circuit, means for maintaining a positive contact between the short contact blade and long base contact on the grounded side of the circuit upon separation of the cap from the base until contact is broken between the long contact blade and short base contact on the ungrounded side of the circuit, and means for preventing insertion of the long contact blade in the short recess, thereby preventing making operative contact between the cap contact blades and base contacts except in one position of assembly of the cap and base.

16. In a polarized electrical circuit, a fixed polarity plug comprising a base and a cap therefor, at least one of which has a metallic casing, the base having recesses of unequal lengths, contacts of unequal length in the recesses, the cap for attachment to the base having contact pins of unequal length for engaging complementary contacts in the base when the base and cap are assembled, means in the recesses for preventing operable assembly of the cap and base except in one position, so that when the base and cap are assembled, one pair of complementary contacts form a portion of the ungrounded side of the circuit and another pair of contacts form a portion of the grounded side of the circuit, a ground for the metallic casing and means electrically connecting the metal casing to a contact in the grounded side of the circuit.

17. In a polarized electrical circuit, a fixed polarity attachment plug comprising a base having recesses of unequal length, contacts in the said recesses of unequal lengths, a cap for attachment to the base having contact pins of unequal length for engaging suitable contacts in the base when the base and cap are assembled properly, means in the recesses for preventing reversed assembly of the cap and base, a cooperating contact pin and base contact being in the ungrounded side of the circuit and another cooperating contact pin and base contact being in the grounded side of the circuit, and a metallic grounding member connecting the outside of the plug to the cooperating ground contacts of the plug, the said grounding member maintaining a positive connection between the ground contacts upon separation of the base and plug until after the cooperating energized contacts are completely separated.

18. In a polarized electrical circuit, a fixed polarity plug comprising a base and a cap therefor, at least one of which has a metallic casing, the base having recesses of unequal length, contacts of unequal length in the recesses, the cap for attachment to the base having contact pins of unequal length for engaging complementary contacts in the base when the base and cap are assembled, means in the recesses for positively preventing all possibility of operable assembly of the cap and base except in one position, so that when the base and cap are assembled, one pair of complementary contacts form a portion of the ungrounded side of the circuit and another pair of contacts form a portion of the grounded side of the circuit, a ground for the metallic casing, and means electrically interconnecting the said casing with the ground side circuit contact, the said means including a member disposed relatively to the complementary ground contacts in the plug to provide a positive electrical connection therebetween upon separation of the cap from the base until the complementary contacts of the ungrounded side of the circuit have become separated fully.

19. A polarized electrical system comprising a current conductor forming the ungrounded leg of the system, a second conductor defining the neutral leg of the system, a connecting device connected to the said conductors and including a metallic casing, a metallic ground for the casing, and a shunt electrically connecting the metallic ground to the said neutral leg.

ALBERT D. TRAHER.